J. M. SIMPSON & J. E. WILKINSON.
KNOTTER FOR HARVESTER BINDERS.
APPLICATION FILED SEPT. 11, 1911.

1,112,389.

Patented Sept. 29, 1914.
2 SHEETS—SHEET 1.

WITNESSES:
W. J. McMillan
E. P. Hall.

INVENTORS
J. M. Simpson
J. E. Wilkinson
BY J. Edward Maybee
ATTORNEY.

THE NORRIS PETERS CO., PHOTO-LITHO., WASHINGTON, D. C.

J. M. SIMPSON & J. E. WILKINSON.
KNOTTER FOR HARVESTER BINDERS.
APPLICATION FILED SEPT. 11, 1911.
1,112,389.
Patented Sept. 29, 1914.
2 SHEETS—SHEET 2.
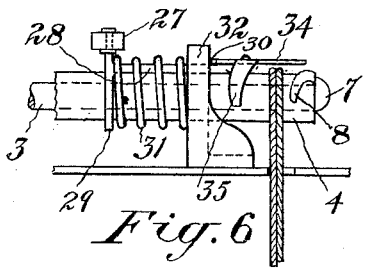
Fig. 6
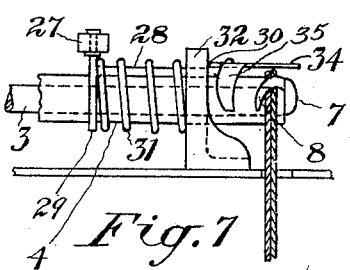
Fig. 7
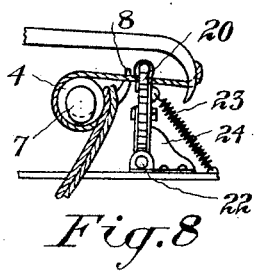
Fig. 8
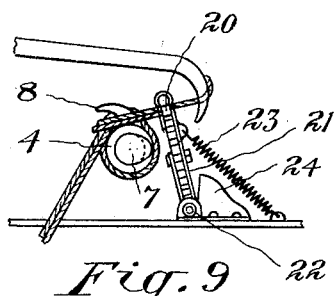
Fig. 9
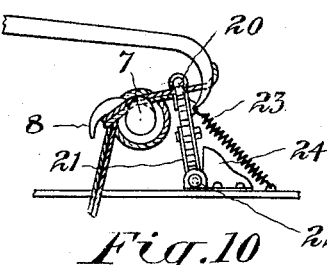
Fig. 10
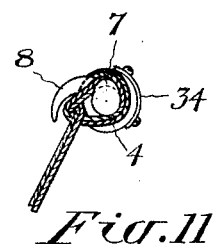
Fig. 11
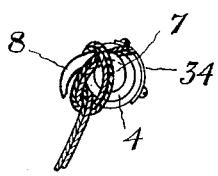
Fig. 12
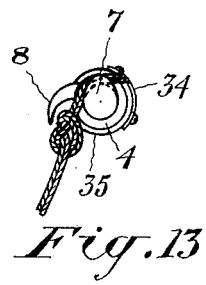
Fig. 13
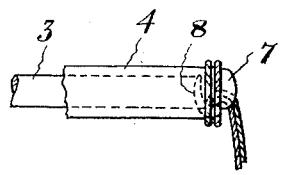
Fig. 14
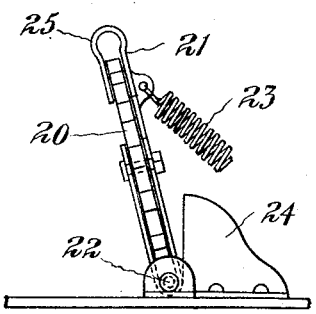
Fig. 15
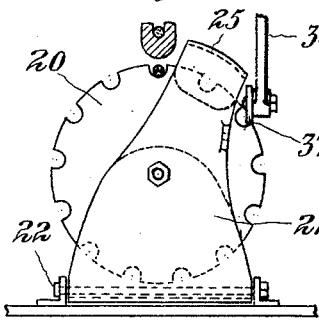
Fig. 16
Fig. 17
WITNESSES:
W. J. McMillan
E. P. Hall
INVENTOR.
J. M. Simpson
BY J. E. Wilkinson
J. Edward Maybee
ATTORNEY.

UNITED STATES PATENT OFFICE.

JOHN M. SIMPSON AND JOSEPH E. WILKINSON, OF WINNIPEG, MANITOBA, CANADA.

KNOTTER FOR HARVESTER-BINDERS.

1,112,389. Specification of Letters Patent. Patented Sept. 29, 1914.

Application filed September 11, 1911. Serial No. 648,766.

*To all whom it may concern:*

Be it known that we, JOHN M. SIMPSON, of the city of Winnipeg, in the Province of Manitoba, Canada, and JOSEPH E. WILKINSON, of the said city of Winnipeg, have jointly invented certain new and useful Improvements in Knotters for Harvester-Binders, of which the following is a specification.

Our object is to devise a simple, easily-constructed, and effective knotter for harvester binders in which all shafts are horizontal and parallel and bevel gearing is dispensed with. We attain our object by means of the construction hereinafter described and illustrated in the accompanying drawings, in which—

Figure 1:
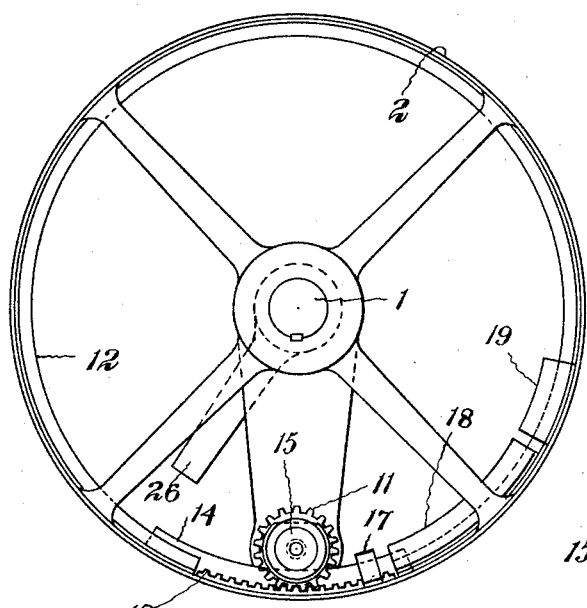
Figure 2:
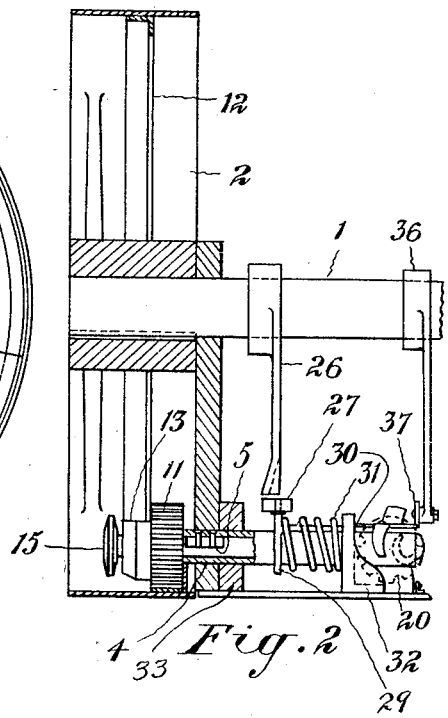
Figure 3:
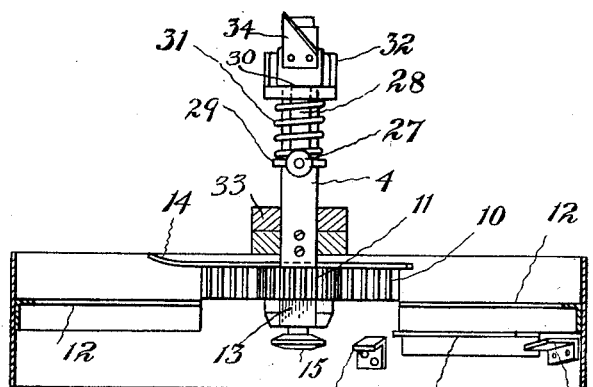
Figure 4:
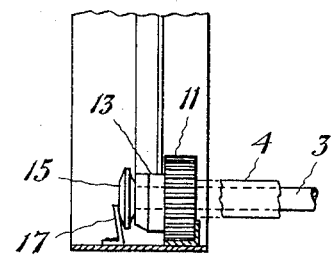
Figure 5:
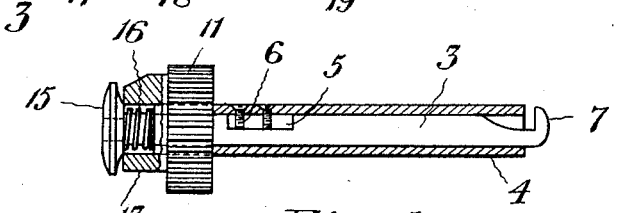

Figure 1 is an end elevation of part of our improved knotter showing particularly the driving means. Fig. 2 is a vertical longitudinal section of the machine. Fig. 3 is a horizontal section of the same. Fig. 4 is a front elevation of part of the knotting spindle and sleeve showing part of the actuating pulley in section. Fig. 5 is a longitudinal section on an enlarged scale of the knotting spindle and sleeve. Fig. 6 is a side elevation of the opposite end of the knotting spindle and sleeve. Fig. 7 is a similar view showing a slightly different position. Figs. 8 to 13 are end elevations of part of the knotting mechanism illustrating different steps in the formation of the knot. Fig. 14 is a rear elevation of the knotting spindle and sleeve substantially in the position shown in Fig. 8. Fig. 15 is a side elevation of the cord holder. Fig. 16 is a front elevation of the same. Fig. 17 is an end elevation of the knotting spindle and sleeve showing particularly the arrangement of the knife.

In the drawings, like numerals of reference indicate corresponding parts in the different figures.

1 is the knotter shaft, which of course will be suitably supported and which carries the pulley 2 which is adapted as hereinafter described to drive the knotting mechanism. The knot-forming mechanism comprises a knotting spindle 3 and a sleeve 4 through which the spindle 3 passes. This sleeve is journaled in suitable bearings so that it is capable not only of a rotary movement but also of an endwise movement. The spindle is also longitudinally movable within the sleeve but is held from rotary movement relative thereto. A suitable connection is provided for this purpose, by forming a slot 5 in the spindle into which project the pins 6 screwed through the sleeve 4. One end of the spindle has a hook 7 formed thereon adapted to coöperate with the end of the spindle to grip the binder twine, as hereinafter described. On the sleeve 4 is suitably formed or secured a curved knotter bill 8 shaped substantially as shown.

In the formation of the knot, the sleeve and spindle must not only be rotated at the proper time, but endwise movements, either separate or simultaneous, must be imparted thereto at proper times. For the purpose of imparting these movements the following means are provided:—A segmental gear 10 is formed within the rim of the pulley 2 and is of sufficient length to impart a complete movement of rotation to the spindle and the sleeve through the medium of the pinion 11 with which it is adapted periodically to engage and which pinion is secured to the sleeve 4. To hold the sleeve from accidental rotation when it is not being positively driven, we provide the cam ring 12 formed on or secured within the pulley 2 which is adapted to engage the flat surface 13 formed on the hub of the pinion 11. A gap is formed in the cam ring 12 opposite to and of the same length as the rack 10 so that at this point the pinion 11 is left free to revolve. At such time as the spindle and sleeve are about to be rotated they are moved bodily toward the left, relative to Fig. 2, to the position shown in that figure, by means of the cam segment 14 which engages the inner face of the pinion 10 and pushes the latter toward the left as the latter rides up its inclined forward end.

It will be noted particularly on reference to Fig. 5 that a disk 15 is secured to the end of the spindle 3 and that the spindle is of such length that when the disk 15 lies against the hub of the pinion 11 that the hook 7 is pushed away from the adjacent end of the sleeve 4 to enable the hook to engage the twine, as hereinafter described. Normally the disk 15 is pushed to the left to space it from the hub of the pinion 11 by means of the light coil spring 16 which engages the disk and the adjacent end of the sleeve 4.

As we have hereinbefore stated, the sleeve and spindle are both pushed to the left by the action of the cam segment 14 while they are rotating. Near the end of this movement of rotation it becomes necessary to move the spindle a short distance to the right independent of the sleeve 4. For this purpose we provide the cam segment 17 which engages the outer face of the disk 15 and thus pushes the spindle to the right. It will be noted that the edges of the disk are beveled to facilitate the movement of the disk through the medium of the various cam segments. After the spindle has thus been independently moved to the right, it becomes necessary to return it to its original position. While the spring 16 may be sufficient for this purpose we prefer to provide the cam segment 18 which enters between the disk 15 and the hub of the pinion 11 and returns the disk to its normal position. Subsequently the spindle and sleeve must be returned simultaneously to their normal position at their limit of movement to the right. This is accomplished by means of the cam segment 19 which engages the outer side of the disk 15 and pushes it and the spindle to the right as desired and necessarily also the sleeve 4. This sequence of movements is repeated of course for every revolution of the knotter shaft 1.

The cord holding mechanism with which the knotting mechanism coöperates is preferably arranged as follows:—Behind the knot-forming ends of the knotting spindle and sleeve a cord-holding disk 20 is located. This disk is journaled on a frame 21 so that the disk rotates transversely to the lead of the twine and parallel to the axis of the knotting spindle and sleeve. This frame 21 is hinged at 22 on the main frame of the device so that it may swing to and from the knotting spindle and sleeve. A coil spring 23 is secured at one end to the main frame of the device and at the other to the frame 21 which tends to swing the knotting disk away from the knotting spindle and sleeve. This movement is, however, limited by the stop 24 formed as a stationary bracket with which the frame 21 may engage. The twine is held by being jammed between the disk, and a plate 25 doubled over the edge of the disk, the twine lying in the notches being necessarily carried between the parts of this plate when the disk is rotated. A stepwise movement of rotation is given to the disk 20 by means of a cam arm 36 secured to the knotter shaft 1, and preferably provided at its end with a roller 37 to reduce friction.

The twine cutting mechanism is preferably arranged as follows: A slide 28 is rigidly connected with a collar 29 loose on the sleeve 4. This slide is limited in its movement to the left by having a square shoulder 30 formed near the right hand end of it, which shoulder engages or comes against the right hand face of the bearing 32 supporting the right hand end of the knotter sleeve and spindle. A coil spring 31 tends to press this collar 29 and the slide 28 to the left, one end bearing against the collar and the other against the bearing bracket 32. The slide 28 passes through a suitable slot in the bearing bracket 32 and carries the knife 34, which is preferably curved to partly embrace the sleeve 4, and is also given a shearing edge, as shown in Fig. 3. The outer end of the slide 28 is preferably provided with the wings 35 which partly embrace the sleeve 4 and serve to steady the slide and also to strip the cord from the sleeve. The knife is moved to the right to cut the twine through the medium of the cam arm 26 secured to the knotter shaft 1, and having its end shaped to engage and push to the right a projection of the slide 28, preferably formed as an anti-friction roller 27.

The mode of operation of this knotter is as follows:—At the commencement of the sequence of operations the spindle and sleeve are at their limit of possible movement to the right the hook 7 lying close against the end of the spindle 3. The twine has been carried forward by the needle in the usual way, and by the rotation of the disk 20 has been caught and held. The twine lies over the sleeve 3, as indicated in Fig. 6, and after passing around the sheaf, is carried forward by the needle and again led over the sleeve to be engaged by the cord holder. Thus, at the commencement of the knot-forming movements two strands of twine lie across the sleeve 4. The sleeve now begins to rotate, and at the same time through the action of the cam segment 14, both it and the spindle within it are moved to the left. This causes the bill 8 to overlie the twine, as shown in Fig. 7. The rotary movement continues and the strands of twine lying over the front of the sleeve slip over the end of the sleeve and spindle, as indicated in Figs. 8 and 14, and are carried around and behind the two strands leading from the cord-holder. The movement is continued until the parts are in the position shown in Fig. 10, at which time the spindle 3 is moved to the right to form a space between itself and the end of the sleeve 4. Into this space the strands of twine leading to the cord-holder drop and are caught and held by the hook. The strands are now cut by knife 34 between the disk 20 and the end of the spindle and the strands lapping around the end of the sleeve are by the endwise movement of discharge sheath 35 (to which the knife 34 is attached) forced over and off the end of the sleeve, allowing them to slip down as shown in Figs. 11 and 12 and complete the formation of the knot, the discharge of the bound sheaf drawing the cut ends of twine out from under the hook 7 endwise.

By this time a complete rotation of the sleeve and spindle has taken place and the parts have returned to their initial position. At this time the spindle and sleeve and all parts attached to and subject to the same movement are pushed to the right to their normal position by the cam 19 provided for that purpose.

From the above description it will be seen that we have devised a knotter in which, as set out in the preamble to the specification, all the shafts may be horizontal and parallel and bevel gearing dispensed with. The use of the ordinary form of bill hook is also avoided.

What we claim as our invention is:—

1. In a knotter the combination of a knotting spindle arranged transversely to the lead of the twine; a hook on the end of the spindle; a rotatable longitudinally movable sleeve in which the spindle is longitudinally movable and in regard to which it is relatively non-rotatable, said hook coöperating with the end of the spindle to grip the twine; a bill carried by the sleeve; and means suitably coördinated for rotating the sleeve and spindle and for sliding them endwise either separately or simultaneously.

2. In a knotter the combination of a knotting spindle arranged transversely to the lead of the twine; a hook on the end of the spindle; a rotatable longitudinally movable sleeve in which the spindle is longitudinally movable and in regard to which it is relatively non-rotatable, said hook coöperating with the end of the spindle to grip the twine; a bill carried by the sleeve; means suitably coördinated for rotating the sleeve and spindle and for sliding them endwise either separately or simultaneously; a cord cutter slidable longitudinally of said sleeve; and means for actuating said cutter to cut the twine.

3. In a knotter the combination of a knotting spindle arranged transversely to the lead of the twine; a hook on the end of the spindle; a rotatable longitudinally movable sleeve in which the spindle is longitudinally movable and in regard to which it is relatively non-rotatable said hook coöperating with the end of the spindle to grip the twine; a bill carried by the sleeve; means suitably coördinated for rotating the sleeve and spindle, and for sliding them endwise either separately or simultaneously; a notched cord-holding disk journaled behind the knotter bill on an axis parallel to the lead of the cord; a coöperating plate bent over the edge of the disk; and means for imparting a stepwise movement of rotation to said disk.

4. In a knotter the combination of a notched cord-holding disk; a plate coöperating therewith bent over the edge of the disk; a knotter shaft; and an arm carried thereby adapted to engage the notches of the disk to impart a step by step movement of rotation to the latter.

5. In a knotter the combination of a knotting spindle arranged transversely of the lead of the twine; a hook on the end of the spindle; a rotatable longitudinally movable sleeve in which the spindle is longitudinally movable and in regard to which it is relatively non-rotatable, said hook coöperating with the end of the spindle to grip the twine; a bill carried by the sleeve adjacent the hook; a pinion secured to the opposite end of the sleeve; a disk secured to the end of the spindle adjacent the pinion so that when the hook is in engagement with the sleeve end the disk is spaced from the pinion; a pulley carrying a segmental gear adapted to drive the pinion; means for holding the pinion from rotation when it is not in mesh with the gear; and cams carried by the pulley adapted to engage the disk and pinion to slide the spindle and sleeve endwise either separately or simultaneously.

Winnipeg this 26th day of August 1911.

JOHN M. SIMPSON.
JOSEPH E. WILKINSON.

Signed in the presence of—
J. J. McBRIDE,
W. E. INGERSOLL.

---

Copies of this patent may be obtained for five cents each, by addressing the "Commissioner of Patents, Washington, D. C."